Jan. 12, 1960     S. N. VALLONE     2,920,435

VACUUM UNIT ATTACHMENT FOR POWER MOWERS

Filed July 14, 1958

INVENTOR.
SAVATORE N. VALLONE

2,920,435
VACUUM UNIT ATTACHMENT FOR POWER MOWERS

Salvatore N. Vallone, Milwaukee, Wis.

Application July 14, 1958, Serial No. 748,385

2 Claims. (Cl. 56—25.4)

This invention relates to tools and more particularly to a lawn treatment tool.

It is an object of the present invention to provide a power operated lawn mower having self contained means for removing grass clippings from the lawn as it is trimmed.

Another object of the present invention is to provide a lawn mower of the above type in which the clipping removing apparatus is power driven directly from the motor of the mower.

Other objects of the invention are to provide a vacuum unit attachment for power mowers bearing the above objects in mind which is of simple construction, has a minimum number of parts, is inexpensive to manufacture and efficient in operation.

Figure 1:
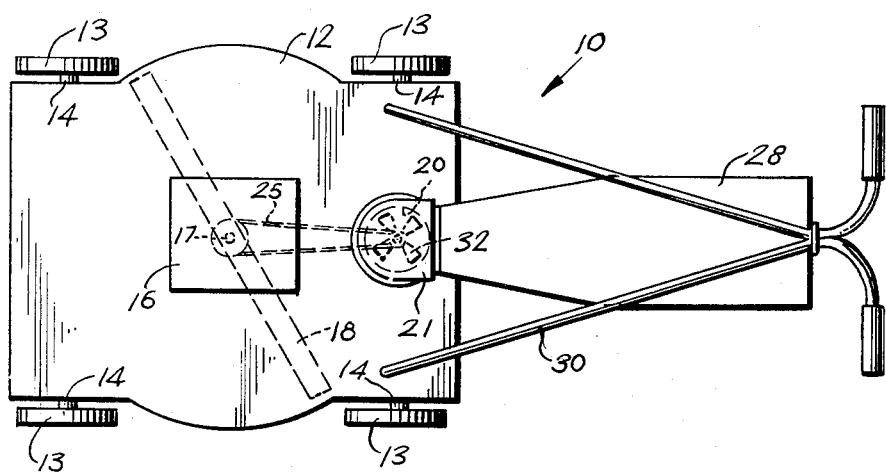
Figure 2:
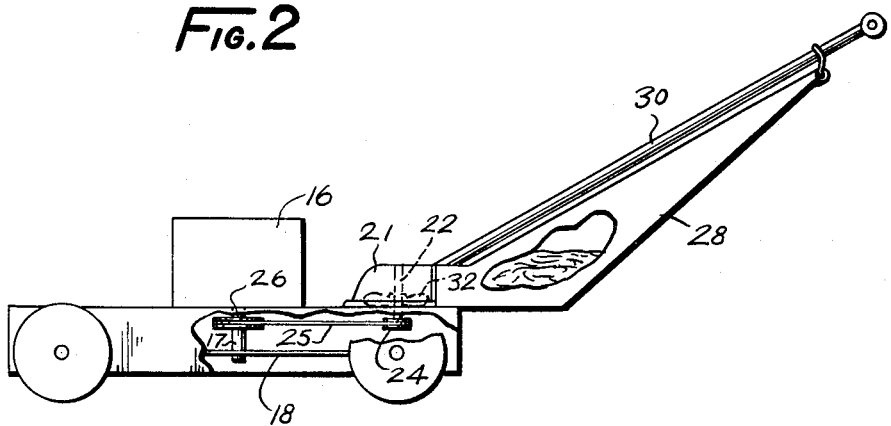

For other objects and for a better understanding of the invention, reference may be had to the following detailed description taken in conjunction with the accompanying drawing, in which:

Figure 1 is a top plan view of a lawn mower made in accordance with the present invention; and Figure 2 is a side elevational view, with parts broken away, of the lawn mower shown in Figure 1.

Referring now more in detail to the drawing, a lawn mower 10 made in accordance with the present invention is shown to include a main rigid housing 12 substantially rectangular in form with the base open to provide access to the interior thereof. The housing has end walls and interconnecting side walls with a top wall, integrally joining the side and end walls. As shown by the drawings the end and side walls are of the same height and integral with each other and the top wall, said top wall being horizontal and parallel to the base edges of the end and side walls. This provides a vacuum chamber which will also house other elements of the invention. Said housing forming a substantially rectangular vacuum chamber substantially free of any openings in the side walls thereof which would allow air to enter therethrough except at the open bottom portion thereof, the open bottom, or base forming a vacuum nozzle having an inlet-mouth whose plane is parallel with the top wall of said housing; said housing supported upon a plurality of spaced axles 14 having a plurality of wheels 13 mounted in the ends thereof for movement over a lawn, the axles 14 extending through journal openings in the side walls of the housing, passing through the interior of the housing and supporting the wheels or their ends outside the housing.

A motor 16 of any desired type is secured upon the top of the housing 12 adjacent to the center thereof and has a downwardly depending drive shaft 17 to which a rotary cutting blade 18 is secured. The top wall of the main housing 12, adjacent to the rear end thereof, has a single circular opening 20 that is in communication with the interior of the main housing 12 and with the interior of an auxiliary housing 21 which has a semi-circular forward wall and a straight transverse rear wall. An auxiliary shaft 22 is rotatably supported within the auxiliary housing 21 and is driven by means of a pulley belt 25 that frictionally rotates the pulley 24 secured to the auxiliary shaft 22 in response to rotation of a drive pulley 26 connected to the shaft 17 of the motor 16, said pulleys and belt being mounted wholly within said main housing 12.

A removable sack 28 having one opening at the lower extremity thereof in communication with the opening in the rear end and the interior of the auxiliary housing 21 receives grass clippings from the interior of the main housing 12 as the grass is trimmed through the action of an impeller blade assembly 32 secured to the auxiliary shaft 22 that is driven by the motor 16 in the aforementioned manner. The upper end of the sack 28 is secured to the handle 30 of the lawn mower, completely independently of any additional attaching or fastening means. When the motor is rotated, it operates the cutting blade 18 and also the impeller blade 32 which creates a vacuum in the vacuum chamber, or interior of the main housing, whereby a suction draft is created in the nozzle to draw the dust, dirt, and grease upwardly, with the air entering only around the lower edges of the end and side walls, from the surface over which the nozzle is moved.

It will now be recognized that as the lawn mower is propelled along the surface of the lawn, the rotary blade 18 will trim the lawn in a well known and conventional manner. However, through the belt connection 25, the impeller blade assembly 32 communicating with the interior of the sack 28 and the housing 12 is operative to draw such grass that is trimmed inwardly and upwardly through the single opening 20 into the auxiliary housing 21 and rearwardly and outwardly into storage relationship within the sack 28 attached to the rear end of said auxiliary housing 21, thus preventing such grass from remaining upon the lawn and otherwise causing the lawn to become discolored and damaged.

While various changes may be made in the detail construction, it shall be understood that such changes shall be within the spirit and scope of the present invention as defined by the appended claims.

What I claim as new and desire to protect by Letters Patent of the United States is:

1. A lawn mower comprising, in combination, a downwardly open main housing, said housing having vertical end and side walls integrally secured together and with a horizontal top wall, said end and side walls being of the same height and having lower edges terminating in a common horizontal plane parallel with the top surface of said top wall, a plurality of axles extending transversely through the side walls of said housing, a wheel mounted on the opposite ends of said axles outside said housing for guided movement upon a lawn, a motor centrally located and supported directly upon the top surface of said top wall, said motor having a depending drive shaft connected therewith and extending into the interior of said housing, a rotary cutting blade secured to the bottom of said drive shaft, an auxiliary housing rearwardly located and secured upon the top surface of said top wall of said main housing, said top wall having a circular opening adjacent the rear end thereof, said auxiliary housing having an open bottom portion, said circular opening in direct alignment with the open bottom of said auxiliary housing joining the interior of said main housing with the interior of said auxiliary housing, a sack having one open end removably secured to said auxiliary housing, a vertical shaft mounted in said auxiliary housing and having an end extending into said main housing, an impeller blade rotatably supported upon the upper end of said vertical shaft, a pulley mounted upon the motor drive shaft and located horizontally within said main housing, a pulley mounted upon the lower end of said auxiliary shaft and located within said main housing, an endless pulley belt connected between and with said pulleys to rotate said impeller blade and produce a vacuum about said belt and said pulleys and in said auxiliary housing and within said main housing, said impeller effecting the drawing of the clippings upwardly from the vicinity of said cutting blade and blowing same rearwardly from the auxiliary housing into said sack at the rear thereof, said pulleys and said belt driven by said motor to drive said impeller located wholly within said main housing.

2. A lawn mower assembly comprising, in combination, a main rigid housing embodying four end and side walls, a top wall and open at its bottom end, two axles mounted on said side walls; a wheel mounted on each end of each axle, said walls of said housing being integrally connected together, said top wall being generally horizontal and said end and side walls being of the same height and terminating at the bottom thereof in a common horizontal plane below said axles and parallel with the horizontal top wall of said housing, a motor carried by the upper surface of said top wall, a vertical shaft driven by said motor and depending therefrom through and under said top wall, a grass cutting blade secured on the lower end of said vertical shaft within said housing, an auxiliary housing open at its bottom end supported and secured upon the upper surface of said top wall, said top wall having a circular opening adjacent the rear wall and midway between the side walls of said main housing, said auxiliary housing mounted directly over said circular opening and enclosing the same whereby said circular opening is aligned with the open bottom of said auxiliary housing joining said main housing with said auxiliary housing, said auxiliary housing having a semi-circular forward wall portion and a straight transverse rear wall portion having an opening therein, a vertical auxiliary shaft rotatably supported with its upper end extending into said auxiliary housing and its lower end depending into said main housing through said circular opening, an impeller blade assembly mounted on said upper end of said auxiliary shaft, a refuse sack, an opening in the lower end of said refuse sack, said sack being removably connected with said auxiliary housing by having its opening in its lower end joining said opening in said transverse rear wall of said auxiliary housing allowing refuse to pass horizontally therethrough, pulleys mounted upon the end of each of said vertical shafts, an endless pulley belt frictionally connected with and between said pulleys, said pulleys and said belt supported wholly within said main housing, said impeller blade assembly driven by the rotation of said auxiliary vertical shaft creates a vacuum in said housing about said pulleys and belt and to draw the grass severed by said cutting blade along with air sucked in around the bottom edges of said end and side walls, said grass and air drawn upwardly by said vacuum through said circular opening in said top wall into said auxiliary housing and then conveyed rearwardly and horizontally under pressure through the opening in the rear wall of said auxiliary housing into said refuse sack attached over said opening in said rear wall thereof, said closed depending end and side walls guiding all air used under the lower edges of the walls adjacent the ground effecting the suction solely adjacent the ground and at the open periphery of said housing.

References Cited in the file of this patent

UNITED STATES PATENTS

| | | |
|---|---|---|
| 2,539,779 | Grosso | Jan. 30, 1951 |
| 2,720,071 | Watonabe | Oct. 11, 1955 |